United States Patent
Thalmann et al.

(10) Patent No.: US 12,064,717 B2
(45) Date of Patent: *Aug. 20, 2024

(54) TREATMENT DEVICE FOR TREATING FLUIDS, IN PARTICULAR LIQUID FLUIDS, AND TREATMENT ELEMENT OF TREATMENT DEVICE

(71) Applicant: MANN+HUMMEL GmbH, Ludwigsburg (DE)

(72) Inventors: Christian Thalmann, Speyer (DE); Robert Hasenfratz, Waiblingen (DE); Fabian Wagner, Moeglingen (DE); André Roesgen, Remshalden (DE); Frank Pflueger, Sachsenheim (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/327,969

(22) Filed: Jun. 2, 2023

(65) Prior Publication Data
US 2023/0311029 A1 Oct. 5, 2023

Related U.S. Application Data

(63) Continuation of application No. 17/339,214, filed on Jun. 4, 2021, now Pat. No. 11,701,602, which is a (Continued)

(30) Foreign Application Priority Data

Dec. 19, 2013 (DE) .................... 10 2013 021 299 .5

(51) Int. Cl.
*B01D 27/10* (2006.01)
*B01D 27/06* (2006.01)
(Continued)

(52) U.S. Cl.
CPC .......... *B01D 27/103* (2013.01); *B01D 27/06* (2013.01); *B01D 35/005* (2013.01);
(Continued)

(58) Field of Classification Search
CPC .... B01D 27/103; B01D 27/06; B01D 35/005; B01D 35/147; B01D 35/306; B01D 2201/4015; B01D 2201/4092
See application file for complete search history.

(56) References Cited

U.S. PATENT DOCUMENTS

10,399,010 B2* 9/2019 Thalmann ............ B01D 27/103
10,399,012 B2* 9/2019 Thalmann ............ B01D 29/21
(Continued)

*Primary Examiner* — Waqaas Ali (57) ABSTRACT

A filter device for treating fluids, in particular for filtering fluids such as fuel, oil, or water, has a housing (56) with a housing pot (58), a housing cover (60), at least one inlet (88) for the fluid to be treated, and at least one outlet (82) for the treated fluid. A connecting head (12) has at least one feed (16) for the fluid to be treated and connectable to the at least one inlet (88), and/or at least one discharge (18). The connecting head (12) and the treatment element (14) can be connected to each other by means of a releasable bayonet-type connecting device (34) through the execution of a rotational/plug-in movement about a connecting axis (20) of the treatment device (10).

10 Claims, 5 Drawing Sheets

Related U.S. Application Data continuation of application No. 16/558,428, filed on Sep. 3, 2019, now Pat. No. 11,027,227, which is a continuation of application No. 15/186,457, filed on Jun. 18, 2016, now Pat. No. 10,399,010, which is a continuation of application No. PCT/EP2014/078240, filed on Dec. 17, 2014.

(51) Int. Cl.
*B01D 35/00* (2006.01)
*B01D 35/147* (2006.01)
*B01D 35/30* (2006.01)

(52) U.S. Cl.
CPC ......... *B01D 35/147* (2013.01); *B01D 35/306* (2013.01); *B01D 2201/4015* (2013.01); *B01D 2201/4092* (2013.01)

(56) References Cited

U.S. PATENT DOCUMENTS

| | | | |
|---|---|---|---|
| 11,027,227 B2 * | 6/2021 | Thalmann | B01D 35/306 |
| 11,701,602 B2 * | 7/2023 | Thalmann | B01D 27/06 |
| | | | 210/435 |

* cited by examiner

TREATMENT DEVICE FOR TREATING FLUIDS, IN PARTICULAR LIQUID FLUIDS, AND TREATMENT ELEMENT OF TREATMENT DEVICE

CROSS-REFERENCE TO RELATED APPLICATIONS

This application is a continuation application of U.S. application Ser. No. 17/339,214 having a filing date of 4 Jun. 2021. U.S. application Ser. No. 17/339,214 is a continuation application of U.S. application Ser. No. 16/558,428 having a filing date of 3 Sep. 2019. U.S. application Ser. No. 16/558,428 is a continuation application of U.S. application Ser. No. 15/186,457 which is a continuation application of international application No. PCT/EP2014/078240 having an international filing date of 17 Dec. 2014 and designating the United States, the international application claiming a priority date of 19 Dec. 2013, based on prior filed German patent application No. 10 2013 021 299.5, the entire contents of the aforesaid US applications, the aforesaid international application and the aforesaid German patent application being incorporated herein by reference to the fullest extent permitted by the law.

TECHNICAL FIELD

The invention relates to a treatment device, in particular a filter device for treating fluids, in particular for filtering fluids, in particular liquid fluids, in particular fuel, oil, or water, in particular of an internal combustion engine, in particular of a motor vehicle, the treatment device comprising a treatment element which has a housing comprising a housing pot, a housing cover, at least one inlet for the fluid to be treated, and at least one outlet for the treated fluid, as well as a connecting head having at least one feed for the fluid to be treated, said feed being connectable to the at least one inlet, and/or at least one discharge for the treated fluid, said discharge being connectable to the at least one outlet, wherein the connecting head and the treatment element can be connected to each other by means of a releasable bayonet-type connecting device through the execution of a rotational/plug-in movement about a connecting axis of the treatment device, and the connecting device has at least one housing connecting part on the side of the housing and at least one head connecting part on the side of the connecting head, said connecting parts being able to interact with each other in order to connect the connecting device.

The invention also relates to a treatment element of a treatment device, in particular a filter device according to the invention for treating fluids, in particular for filtering fluids, in particular liquid fluids, in particular fuel, oil, or water, in particular of an internal combustion engine, in particular of a motor vehicle, the treatment element having a housing comprising a housing pot, a housing cover, at least one inlet for the fluid to be treated, and at least one outlet for the treated fluid, as well as a connecting head having at least one feed for the fluid to be treated, said feed being connectable to the at least one inlet, and/or at least one discharge for the treated fluid, wherein the treatment element can be connected to a connecting head of the treatment device by means of a releasable bayonet-type connecting device through the execution of a rotational/plug-in movement about a connecting axis of the treatment device, and the connecting device has at least one housing connecting part on the side of the housing that can interact with at least one head connecting part on the side of the connecting head for the purpose of connecting the connecting device, wherein the at least one inlet can be connected to at least one feed of the connecting head for the fluid to be treated and/or the at least one outlet can be connected to at least one discharge of the connecting head for the treated fluid.

BACKGROUND

DE 10 2010 035 465 A1 discloses a filter for filtering fluids, in particular liquid fluids, in particular fuel or oil, in particular of an internal combustion engine, the filter comprising a filter pot in which a filter element is arranged, and a filter head having an inlet and/or an outlet for the fluid. The filter head and the filter pot are connected to one another by means of a releasable bayonet-type rotational/plug-in connector. The rotational/plug-in connector comprises at least two interacting catch components, one of which is connected to the filter pot and the other of which is connected to the filter head.

The invention addresses the problem of providing a treatment device and a replaceable filter of a filter device of the aforementioned type, with which it is possible to facilitate the connection of the treatment element, in particular of the replaceable filter to the connecting head and facilitate separation from the connecting head. The invention is also intended to reduce the space required, in particular for the connecting device, in particular in the axial direction with respect to the connecting axis.

SUMMARY

This problem is solved according to the invention in that: at least one first connecting part has a respective functional surface on faces lying axially opposite one another with respect to the connecting axis; at least one second connecting part of the connecting parts has at least one counter functional surface which engages behind one of the functional surfaces of the at least one first connecting part for interaction purposes; at least one guiding element is arranged on the face of the at least one second connecting part, said guiding element delimiting at least one insert gap together with the at least one counter functional surface, the axial extension of the insert gap with respect to the connecting axis being at least as large as the maximum axial distance between the two axially opposing functional surfaces of the at least one first connecting part; and the at least one first connecting part can be guided in the insert gap when the connecting device is being opened/closed, one of the functional surfaces of the at least one first connecting part being guided along the counter functional surface, and the other functional surface being guided along the at least one guiding element.

Provided according to the invention is at least one guiding element, in particular a guide peg, with the aid of which the at least one first connecting part can be guided on the side lying axially opposite to the counter functional surface. The at least one connecting part can thus be guided between the at least one guiding element and the corresponding counter functional surface of the at least one second connecting part. In this manner, a precise rotational/plug-in movement can be executed. It is furthermore possible to reduce the risk of the treatment element being tilted relative to the connecting axis when being installed/dismantled. With the aid of the at least one insert gap, the at least one first connecting part can be easily and accurately positioned relative to at least one second connecting part when the treatment element is being installed.

The at least one counter functional surface engages behind at least one of the functional surfaces of the at least one connecting part. In this manner, between the at least one counter functional surface and the corresponding functional surface, a tension connection can be realized axially to the connecting axis.

Advantageously for the realization of the bayonet-type connection, the at least one counter functional surface may extend circumferentially with respect to the connecting axis.

Advantageously, the circumferential extension of the regions of the bayonet-type connecting device in which the at least one counter functional surface interacts with the corresponding at least one functional surface in the closed state of the connecting device may be at least 50%, preferably more than 60% of the circumference of the treatment element. In this manner, a corresponding larger region that can act in a force-transmitting manner can be realized. In addition, the forces between the treatment element and the connecting head can act circumferentially better and more uniformly. It is also possible, then, to transmit greater forces overall. Thus, the stability of the connection to the connecting device can be improved. The mechanical load of the connecting device can thus be reduced. This can positively affect the service life.

In an advantageous embodiment, the at least one counter functional surface and the at least one functional surface interacting therewith may each comprise at least one latch element, in particular a latching projection or a latch section of at least one catch lock, which latch one behind the other or with or into one another in the closed position of the at least one connecting device. The catch lock makes it possible to reduce the risk of the connecting device being released through an undesired rotation of the treatment element about the connecting axis. In order to close and release the at least one catch lock, the corresponding latch elements can be separated from one another or guided past one another by the corresponding rotation of the treatment element. So doing may require overcoming corresponding latching forces. The presence of the treatment element at the correct position thereof can also be easily detected at such an increased expenditure of force in the installation.

In another advantageous embodiment, the connecting device may comprise at least one biasing element for realizing a mechanical bias with which the at least one counter functional surface can be pressed against the at least one functional surface. In this manner, the connecting device can be kept under a mechanical stress. Operational vibrations can thus be dampened. It is also possible to reduce operational noise. In particular, any rattling that might occur can be prevented. Moreover, it is possible to generate or increase any latching force that must be overcome in order to close or open the latching.

The at least one biasing element may advantageously be arranged on the connecting head. In this manner, the biasing element can be configured as a lifetime component. The biasing element need not be replaced together with the treatment element. Alternatively or additionally, at least one biasing element may be arranged on the housing. The biasing element then can be replaced together with the treatment element.

The at least one biasing element may advantageously be elastic. The at least one biasing element may be elastic due to the shape thereof and/or the material composition thereof. Advantageously, the at least one biasing element may comprise or be made of plastic, in particular elastomer. Advantageously, the at least one biasing element may be or comprise a spring element, in particular a leaf spring. The spring element may advantageously be made of an elastic metal.

The at least one biasing element may additionally have a sealing function. The at least one biasing element may be combined with a seal or a sealing unit, or vice versa. Additionally or alternatively, the at least one biasing element may be realized with a non-return diaphragm of the treatment element, or vice versa. The non-return diaphragm makes it advantageously possible to lock a passage for the fluid through the housing, preferably the at least one inlet, in one direction of flow. In this manner, the fluid can be prevented from returning.

Optionally, a seal may be arranged between a pre-filtration side and a post-filtration side of the treatment element, in particular of a filter element.

The at least one first connecting part and/or the at least one second connecting part may each be realized with a low material thickness in comparison to the radial and circumferential extension thereof with respect to the connecting axis. The material thicknesses of the at least one first connecting part and the at least one second connecting part may be of similar size.

In another advantageous embodiment, the material thickness of the at least one first connecting part and/or the at least one second connecting part may advantageously be at most 3 mm, preferably between 1 and 2 mm.

In another advantageous embodiment, the axial extension of the at least one insert gap may be at most 3 mm, preferably between 1 and 2 mm.

The connecting parts may be shaped—in particular, bent, folded, kinked, cut, punched, or the like—accordingly out of semi-finished products or molded parts. The corresponding latch sections and (counter) guiding sections may optionally be realized in this manner.

Advantageously, at least a part of the semi-finished products or molded parts may be provided radially inside the first connecting parts, which are shaped—in particular, bent, folded, kinked, cut, punched, or the like—out of semi-finished products or molded parts. Advantageously, the part of the semi-finished products or the molded parts that is arranged radially within the first connecting parts is closed in the circumferential direction. This makes it possible to improve the stability of the connecting device and thus the rigidity and durability of the connection between the connecting devices.

The connecting parts may advantageously be arranged within the at least one circumferential wall of the housing and/or the connecting head. In this manner, the bayonet-type connecting device is protected from the surroundings. The connecting device may advantageously be arranged in a corresponding connection space between the housing and the connecting head.

Advantageously, the at least one counter functional surface may abut against the corresponding functional surface over the largest possible extension and preferably the entire extension thereof in the circumferential direction as well as in the radial direction with respect to the connecting axis. In this manner, the transmission of forces between the connecting parts can be improved. Corresponding guide contours of the at least one counter functional surface may slide along the corresponding guide contours of the corresponding functional surface when the connecting device is being opened or closed.

In this manner, it is possible to compress any biasing element and/or a seal when the connecting device is being closed. In the case of a seal, the sealing function can thus additionally be improved.

Advantageously, the at least one counter functional surface and the corresponding functional surface interacting therewith may be complementary. In this manner, said surfaces may lie flat against one another in the closed position of the connecting device. The transmission of forces can thus be improved. Loading of the components involved can thus be further reduced. The components may be dimensioned so as to be smaller in order to transmit equal forces. Adapting the shapes of the connecting parts to one another enables a corresponding reduction in the axial extensions of the connecting parts. Advantageously, the connecting parts may be mutually engaging molded parts. The contours of the at least one counter functional surface and the corresponding functional surface may slide along one another when the connecting device is being opened or closed.

In another advantageous embodiment, the at least one counter functional surface and at least the functional surface interacting therewith may each travel substantially helically about the connecting axis. In this manner, the housing connecting part can be drawn toward the connecting head in the axial direction at the same time as rotation of the treatment element in the direction of closing, by means of the connecting part. A combined rotational/plug-in movement can thus be realized. Advantageously, the pitches of the at least one counter functional surface and the at least one functional surface may be identical.

Advantageously, the pitches may correspond to the pitch of a typical right-handed thread. In this manner, the connecting device can be closed by rotation of the treatment element to the right and opened by rotation of the treatment element in the opposite direction, as is typical with fuel filters or oil filters.

Advantageously, a height may correspond axially to the connecting axis—which is traveled when the bayonet-type connecting device is closed—to an axial distance of a possible seal on the side of one of the connecting parts from a corresponding seal surface on the side of the other connecting part. In this manner, the corresponding seal can be positioned on the corresponding seal surface through the rotational/plug-in connection when the connecting device is being closed.

In another advantageous embodiment, the treatment element—in particular a housing cover and/or an end plate of a possible filter element—and the connecting head may each comprise at least one correspondence element, in particular a connecting piece, preferably a sealing connecting piece and/or cylindrical connecting piece, which can correspond in a pairwise manner when the treatment element is mounted. Advantageously, correspondence elements—in particular, the connecting pieces—may engage with one another. In this manner, the correspondence elements may be fixed radially with respect to the connecting axis relative to one another. Alternatively, the correspondence elements may be arranged in pairs abutting against, in particular with interposition of a sealing device. In this manner, radial positional tolerances can be easily compensated with respect to the connecting axis.

Advantageously, at least one pair of correspondence elements may radially outwardly and/or radially inwardly delimit a fluid-conducting space.

In another advantageous embodiment, at least one pair of correspondence elements may be arranged within at least one other pair of correspondence elements. In this manner, a first fluid-conducting region, in particular an outlet channel for the fluid, can be realized in the inner pair of correspondence elements.

Between the inner pair of correspondence elements and the outer pair of correspondence elements, there may advantageously be realized a second fluid-conducting space, in particular an annular inlet space for the fluid.

The correspondence elements, in particular the pairs of correspondence elements, may each be coaxial to the connecting axis. In this manner, the correspondence elements can be more easily positioned relative to one another. In addition, the fluid-conducting spaces may then be circumferentially more uniform.

At least one pair of correspondence elements, in particular a radially outer pair of correspondence elements, may advantageously circumferentially surround a plurality of fluid-conducting regions, in particular at least one inlet region and at least one outlet region for the fluid. In this manner, the corresponding fluid-conducting regions can be easily delimited from the surroundings with only one pair of correspondence elements. Here, contact regions between the correspondence elements of one pair may optionally be sealed off with only one single sealing unit.

Advantageously, the connecting parts of the connecting device may be arranged radially outside of the pair of correspondence elements, which may circumferentially surround all of the fluid-conducting regions. In this manner, the fluid-conducting regions can be separated with only one pair of correspondence elements, optionally with only one sealing device, from the connecting parts of the connecting device and preferably also from the surroundings. The connecting parts of the connecting device can thus be easily protected from the fluid.

Advantageously, at least one sealing device, in particular a sealing ring or preferably an O-ring seal or a combined seal/non-return diaphragm may be arranged between the correspondence elements of at least one pair. Thus, the fluid-conducting regions delimited with the at least one pair of correspondence elements can be better sealed off from the contact region of the connecting pieces.

Advantageously, at least one fluid-conducting region of the treatment device can be sealed off from the surroundings with the at least one sealing device. Advantageously, the outer sealing ring projects upwards or downwards in the axial direction by at most 5 mm beyond the connecting device. This is advantageous with respect to the use of installation space because the sealing region uses the axial extension of the connecting device.

Preferably, the at least one sealing device may surround the at least one inlet and the at least one outlet circumferentially with respect to the connecting axis. In this manner, with only one seal, it is possible to seal a plurality, in particular all of the fluid-conducting spaces off from the outside, in particular from the surroundings and/or from the connecting parts of the connecting device.

Advantageously, at least one sealing device, in particular a sealing ring or a ring seal unit may be located as close as possible to the connecting axis, and thus have the smallest possible diameter. In this manner, it is possible to reduce a force which may be applied in the axial direction to the connecting device by the at least one sealing device. The connecting parts of the connecting device can thus be mechanically relieved. Endowing the at least one sealing device with the smallest possible diameter makes it possible to reduce the torque required to open or close the connecting device. Correspondingly, it is then possible to reduce the required force of opening or closing. This can have an advantageous impact on the ease of maintenance and/or the capacity of the treatment element.

Advantageously, the at least one sealing device may comprise an O-ring or a molded seal. The sealing device may advantageously act so as to seal radially, in particular, outward or inward with respect to the connecting axis. Additionally or alternatively, the at least one sealing device may act so as to seal in the axial direction.

The sealing groove of the sealing unit may be covered with a separate cover ring on the side thereof that faces axially away from the filter bellows. The cover ring may then be connected to the outer sealing connecting piece by means of clamping lugs.

In a preferred embodiment, the sealing groove of the sealing unit is not formed by means of a separate cover ring, but rather as part of the housing cover, integrally with the housing cover. This can have an advantageous impact on the capacity of the treatment element.

Advantageously, at least one sealing device may be arranged on the treatment element, in particular on the housing cover and/or optionally the end plate of the filter element. In this manner, the at least one sealing device can be replaced together with the treatment element.

Advantageously, at least one spacer may be provided between the treatment element, in particular the end plate of the filter element. The spacer may be a plastic spacer. Connected to this is the advantage of a greater ease of manufacturing.

Advantageously, the at least one guiding element may brush along the corresponding at least one functional surface when the treatment element is rotated. In this manner, in particular when the connecting device is opened, an axial pressing-off force on the corresponding functional surface can be generated. With the axial pressing-off force, it is possible to press against a mechanical holding force of the at least one sealing device. Thus, the at least one sealing device can be withdrawn or rotated from a corresponding sealing surface, or vice versa.

In another advantageous embodiment, a material thickness of the at least one first connecting part and/or the at least one second connecting part in the circumferential direction may be respectively constant in the region of the at least one functional surface/counter functional surface. The space required for the connecting device—in particular, the axial space—can thus be reduced.

In another advantageous embodiment, the at least one first connecting part and/or the at least one second connecting part may be made of sheet metal or comprise sheet metal. Sheet metal can generally be present in the initial state, as rolled metal in the shape of flat, level panels or strips. Sheet metal is easily realized with a uniform thickness. A mechanically stable connecting part can also be realized with a relatively small material thickness from sheet metal. In this manner, the required installation space, in particular in the axial direction, for the connecting device can be reduced. Sheet metal can be easily machined or processed, in particular bent, folded, punched, cut, or welded. With sheet metal, it is easy to realize connections between components, in particular crimped connections or welded connections. Advantageously, at least one of the connecting parts may be implemented as a shaped sheet metal part.

Advantageously, at least one of the connecting parts may be fixedly or releasably connected to the treatment element. At least one of the connecting parts may be fixed or releasably connected to the connecting head. The at least one connecting part may be connected to the treatment element or the connecting head by means of a materially integral connection and/or a positive and/or non-positive connection, in particular by means of a crimped connection, a welded connection, a clamped connection, a latched connection, a plug connection, a threaded connection, and/or an adhesive connection.

Advantageously, the housing connecting part may be connected to the housing cover and/or the housing pot, in particular by means of a crimped connection and/or a welded connection. In this manner, the housing connecting part may be stably connected to the treatment element. The housing connecting part may then be easily replaced together therewith.

Advantageously, the housing connecting part may be held on the housing by means of a crimped connection formed between the housing cover and the housing pot.

The housing connecting part may advantageously be flush in the axial direction with the axially outermost surface of the crimped connection provided between the housing cover and the housing pot.

Advantageously, the housing cover may be connected in a sealed manner to the housing pot with the use of a sealing material, in particular a sealant, by means of a crimped connection Advantageously, a head-side connecting part may preferably be threaded or welded onto the connecting head. The use of a threaded connection makes it possible for the head-side connecting part to be easily released from the connecting head when necessary.

Advantageously, the housing cover may be, in particular, elastically deformable. The housing cover can then be pressed against the connecting head by an overpressure, in particular, one that prevails in the housing during operation of the treatment device. The connecting head can thus support the housing cover. It is thus possible to reduce the requirements for the pressure stability of the housing cover. The housing cover can then be more easily realized, in particular from simpler materials.

Advantageously, a plurality of functional surfaces of the at least one first connecting part and corresponding counter functional surfaces of the at least one second connecting part may be arranged so as to be circumferentially, in particular, uniformly distributed with respect to the connecting axis. It is thus possible to improve a circumferential, in particular uniform transmission of force. It is additionally possible to reduce overall an angle of rotation that is required to close and open the connecting device. The circumferential extension of each of the individual functional surfaces/counter functional surfaces may be then be lower than with the use of only one single pair of one counter functional surface and one corresponding functional surface. Achieving a comparable uniform transmission of force requires that a single pair of one counter functional surface and one functional surface extend at least once over the entire circumference.

Advantageously, the treatment device may be a filter device for filtering liquid fluids, in particular fuel, oil, or water. The filter device may advantageously be used in an internal combustion engine.

Advantageously, the treatment element may be a replaceable filter, in particular a replaceable filter for oil or fuel. The housing of the treatment element may then be a filter housing. Advantageously, in the filter housing, at least one filter element may be arranged so as to be able to separate the at least one inlet from the at least one outlet. The connecting head may advantageously be a filter head, onto which the replaceable filter, in particular the filter housing, can be releasably mounted by means of the connecting device.

A replaceable filter is typically a filter with which the at least one filter element is replaced together with the filter housing. Generally, the at least one filter element is arranged fixedly in the filter housing. Correspondingly, the connections between the housing pot and the housing cover need not be non-destructively releasable.

The invention is not limited to a treatment device of an internal combustion engine of a motor vehicle. Rather, the invention may also be used for other types of internal combustion engines, in particular industrial engines. The invention can also be used with other types of treatment devices for fluid inside or outside the field of motor vehicle technology. The invention may even be used with air de-oiling boxes or desiccant boxes.

This problem is also solved through the treatment element in that: the treatment element comprises at least one first one of the connecting parts and/or at least one second one of the connecting parts, wherein the at least one first connecting part has a respective functional surface on faces lying axially opposite one another with respect to the connecting axis; at least one second connecting part of the connecting parts has at least one counter functional surface which engages behind one of the functional surfaces of the at least one first connecting part for interaction purposes; at least one guiding element is arranged on the face of the at least one second connecting part, said guiding element delimiting at least one insert gap together with the at least one counter functional surface, the axial extension of the insert gap with respect to the connecting axis being at least as large as the maximum axial distance between the two axially opposing functional surfaces of the at least one first connecting part; and the at least one first connecting part can be guided in the insert gap when the connecting device is being opened/closed, one of the functional surfaces of the at least one first connecting part being guided along the counter functional surface, and the other functional surface being guided along the at least one guiding element.

The advantages and features shown in connection with the treatment device according the invention and the advantageous embodiments thereof apply correspondingly to the treatment element according to the invention and the advantageous embodiments thereof, and vice versa.

BRIEF DESCRIPTION OF THE DRAWINGS

Other advantages, features, and details of the invention shall be made more apparent by the following description, which addresses embodiments of the invention in greater detail, with reference to the accompanying drawings. The features disclosed in the drawings, the description, and the claims in combination will be individually considered, as appropriate, and combined into other appropriate combinations by a person skilled in the art. In the schematic drawings.

In the drawings, like components are assigned like reference signs.

DETAILED DESCRIPTION

FIGS. 1 to 6 illustrate different perspectives, sections, and detail views of a filter device 10 for engine oil of an engine oil circuit of an internal combustion engine of a motor vehicle, and components thereof. The filter device 10 serves to purify the engine oil.

Figure 6:
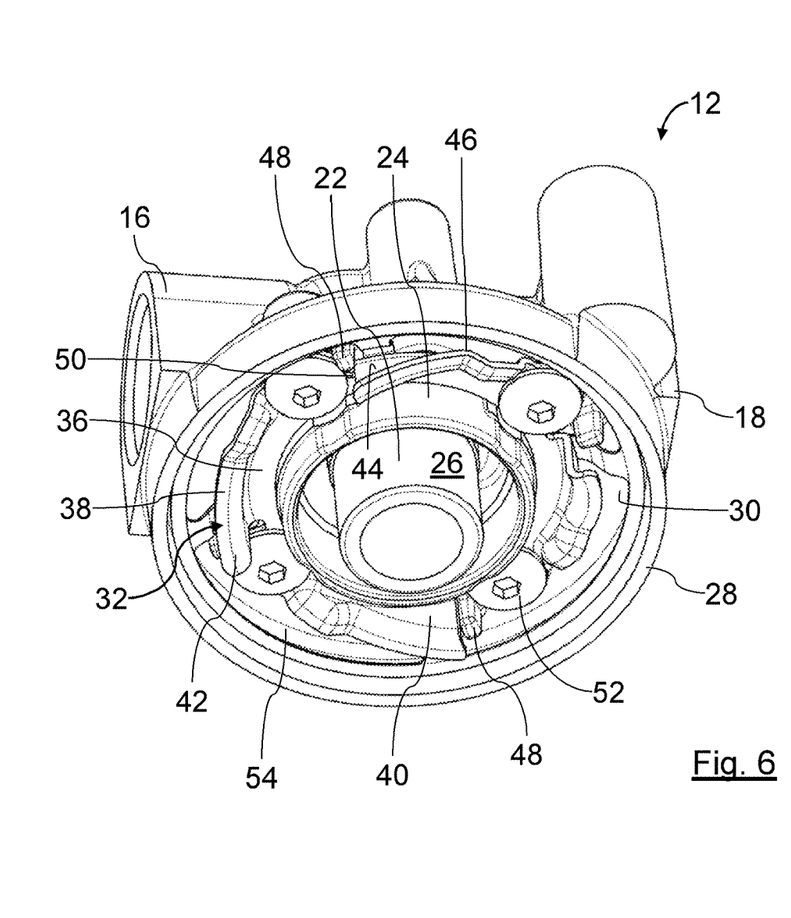
FIG. 6 is an isometric depiction of the filter head of the filter device from FIGS. 1 to 4.

The filter device 10 comprises a filter head 12, to which a replaceable filter 14 is releasably attached. The filter head 12 is fixedly connected to the internal combustion engine and serves as a connector part for the replaceable filter 14. FIG. 6 illustrates the filter head 12 in detail. The filter head 12 comprises a feed 16 and a discharge 18 for the engine oil. The feed 16 and the discharge 18 are connected to corresponding oil lines of the internal combustion engine, in a manner that is not of further interest here.

The filter head 12 further comprises a radially inner connecting piece 22 that is coaxial with respect to a connecting axis 20.

Subsequent discussion of "axial," "radial," "coaxial," "circumferential," or the like is made with respect to the connecting axis 20, unless otherwise indicated. In the embodiment depicted, the connecting axis 20 coincides with a filter axis of the replaceable filter 14.

The inner connecting piece 22 is approximately circularly cylindrical. The connecting piece extends on the side of the filter head 12 that faces the replaceable filter 14. It is open on both end faces. On the side thereof that faces away from the replaceable filter 14, the inner connecting piece 22 is connected fluidically to the discharge 18.

The inner connecting piece 22 is surrounded coaxially by a circularly cylindrical, radially outer connecting piece 24. The inner connecting piece 22 projects beyond the outer connecting piece 24 in the axial direction on the side thereof that faces the replaceable filter 14.

The inner connecting piece 22 and the outer connecting piece 22 each circumferentially delimit a coaxial annular inlet space 26. The annular inlet space 26 is connected to the feed 16 via a fluid connection.

The inner connecting piece 22 and the outer connecting piece 24 are coaxially surrounded by a circularly cylindrical circumferential wall 28. The free edge of the circumferential wall 28 facing the replaceable filter 14 is located approximately at the same axial height as the free edge of the outer connecting piece 24. The circumferential wall 28 forms the radially outer delimitation of the filter head 12 on the side facing the replaceable filter 14. The circumferential wall 28 and the outer connecting piece 24 each circumferentially delimit an annular, coaxial connection space 30.

Arranged in the connection space 30 is a head connecting part 32 of a releasable bayonet-type connecting device 34. The replaceable filter 14 is releasably attached with the connecting device 34 to the filter head 12. The head connecting part 32, which overall is approximately annular in shape, is formed of sheet metal. The thickness of the sheet metal is constant, at about 2 to 3 mm.

Radially inwardly, the head connecting part 32 comprises an annular head mounting section 36. The head mounting section 36 pushes with the radially inner circumference side thereof approximately against the radially outer circumference side of the outer connecting piece 24. The head mounting section 36 extends radially and circumferentially approximately in the same plane. The head connecting part 32 extends radially approximately as far as the middle of the connection space 30.

The head mounting section 36 passes into four head-side bayonet sections 38. The head-side bayonet sections 38 are identical in shape and size. The head-side bayonet sections 38 are arranged so as to be distributed circumferentially uniformly. The head-side bayonet sections 38 each have a circumference section 40 that extends substantially circumferentially parallel to an imaginary circular cylinder connecting part about the connecting axis 20. The circumference sections 40 each pass into a functional section 42 on the sides thereof facing away from the head mounting section 36. The circumference sections 40 thus connect the head mounting section 36 to the respective portion sections 42. The functional sections 42 are easily visible in particular in FIG. 6. The functional sections 42 each have a counter functional surface 44 on the side thereof facing away from the replaceable filter 14.

The functional sections 42, in particular the counter functional surfaces 44, each travel approximately helically about the connecting axis 20. The pitch of the counter functional surfaces 44 and the functional sections 42 corresponds approximately to the pitch of a typical right-handed thread. Viewed axially out from the replaceable filter 14, the ends of the functional sections 42 that are to the front in the clockwise direction are each closer to the replaceable filter 14 than the ends that are to the rear in the clockwise direction. Present between the front ends of the functional sections 42 and the place of the head mounting section 36 are respective gaps through which corresponding housing-side bayonet sections 104 (described in greater detail below) can be introduced.

The sheet metal of the head connecting part 32 is of equal thickness in the head mounting section 36, in the circumference sections 40, and in the functional sections 42. This also signifies that the sheet metal has a uniform axial extension in the head mounting section 36 and in the functional sections 42.

The functional sections 42 each have a head-side latching projection 46. The latching projections 46 are realized as respective bends in the counter functional surfaces 44. The latching projects 46 rise axially on the side facing the replaceable filter 14.

Viewed out from the replaceable filter 14, a guide peg 48 is arranged in front of each of the functional sections 42 in the clockwise direction. The guide pegs 48 are illustrated, for example, in FIG. 6. The guide pegs 48 are attached to the filter head 12 in a manner separated from the head connecting part 32. The guide pegs 48 are each located at the insertion side of the head-side bayonet sections 38. With the counter functional surfaces 44, the guide pegs there each delimit a head-side insert gap 50, also illustrated in FIG. 6.

The head connecting part 32 is attached to the filter head 12 at the head mounting section 36 with four screws 52 in total, as illustrated in FIG. 6, from the side facing the replaceable filter 14. The screws 52 are each located between an end of one of the head-side bayonet sections 38 to the rear in the clockwise direction and one of the guide pegs 48 in front of the end of the next head-side bayonet section 38 to the front in the clockwise direction.

An annular leaf spring 54 is also arranged coaxially in the connection space 30. A radially outer circumferential side of the leaf spring 54 extends circumferentially along the radially inner circumferential side of the circumferential wall 28. The leaf spring 54 has four spring arms in total. The spring arms are distributed circumferentially uniformly. With respect to the connecting axis 22, the spring arms extend approximately helically in the same direction of rotation as the functional sections 42 of the head connecting part 32. The spring arms are resiliently flexible in the axial direction.

Figure 5:
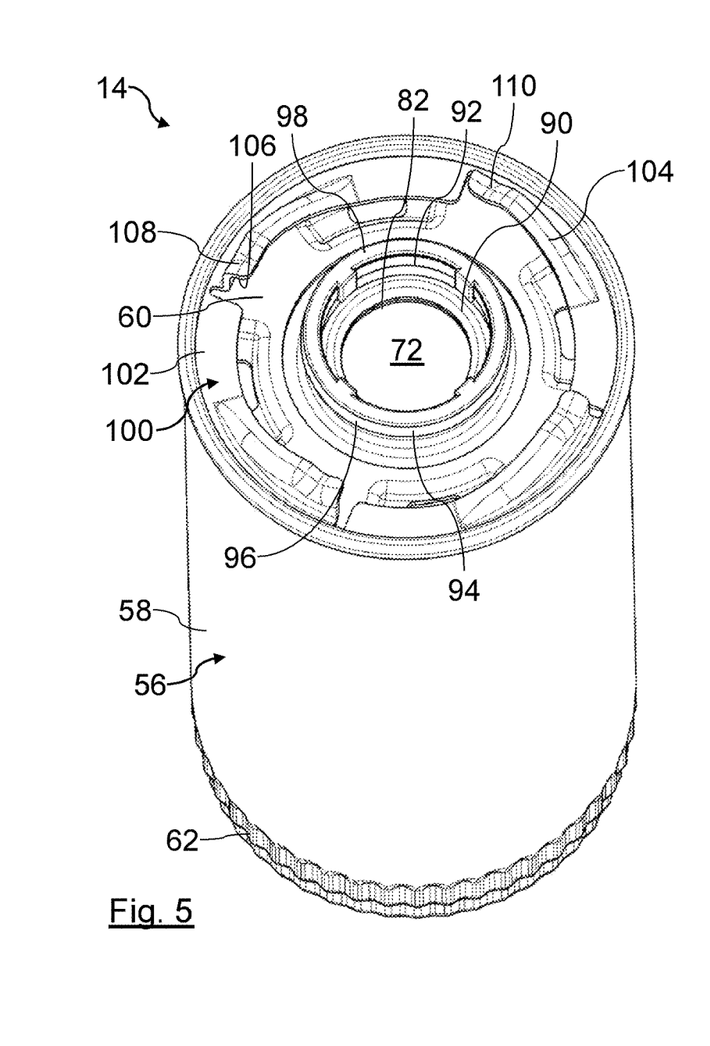
FIG. 5 is an isometric depiction of the replaceable filter of the filter device from FIGS. 1 to 4.

The replaceable filter 14 is designed as a spin-on filter having a circular cross-section. The replaceable filter is substantially coaxial to the connecting axis 20. The replaceable filter 14 comprises a filter housing 56 having a housing pot 58, to open sides of which a housing cover 60 is attached at the radially outer edge thereof by means of a crimped connection. A radially outer diameter of the filter housing 56 in the region of the housing cover 60 is smaller than a radially inner diameter of the circumferential wall 28 of the filter head 12. The housing pot 56 has an outwardly curved housing bottom 62. The housing cover 60 and the housing pot 58 are made of metal.

A coaxial filter element 64 is arranged in the housing pot 58. The filter element 64 has a filter medium that is folded into a filter bellows 66 and is circumferentially closed. At end faces thereof, the filter bellows 66 is respectively connected in a sealed manner to a connecting end plate 68 (above in FIG. 1) and a counter end plate 70 (below in FIG. 1). The connecting end plate 68 is located on the side of the filter element 64 that faces the housing cover 60.

Figure 1:
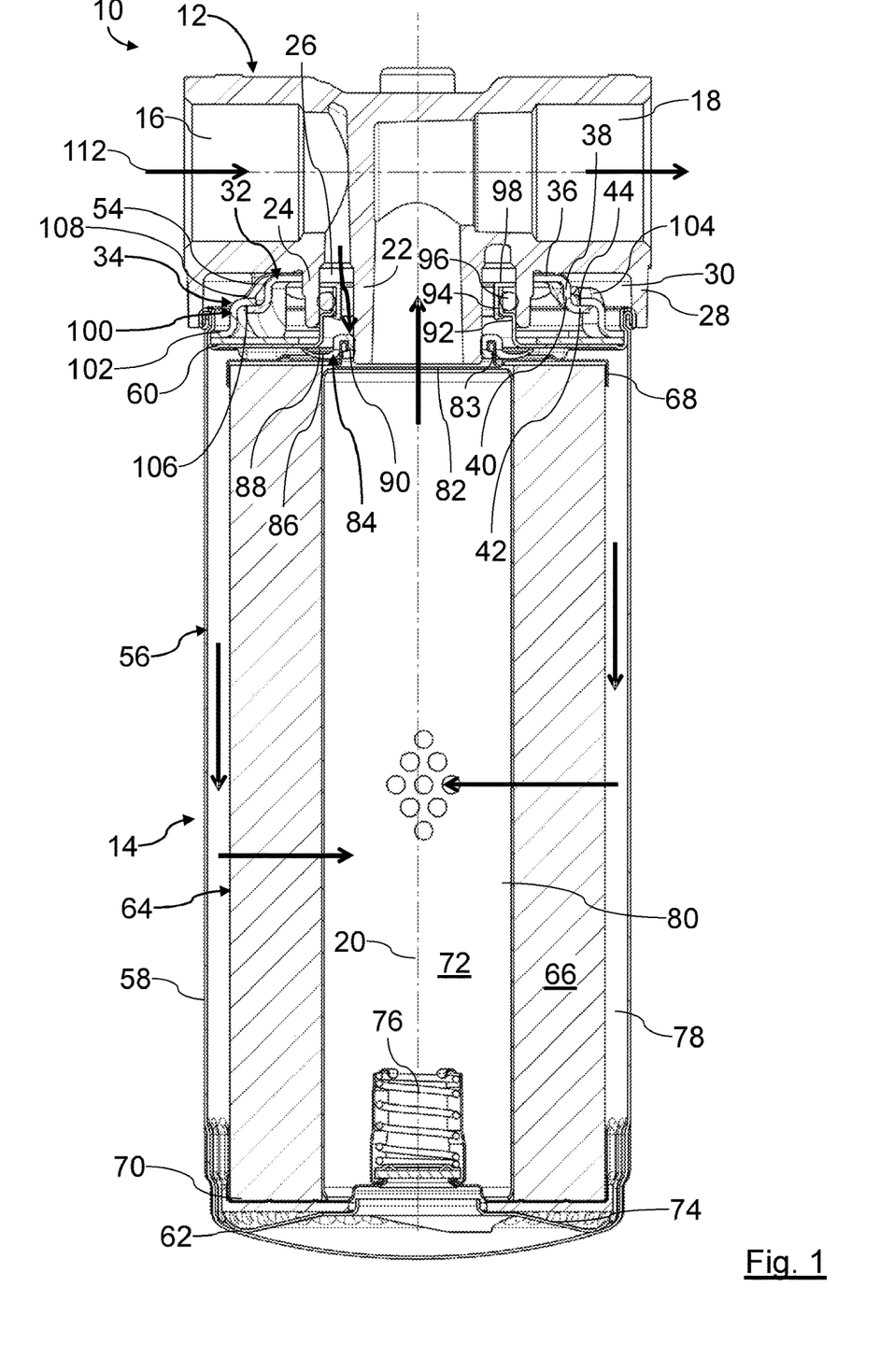
FIG. 1 illustrates a longitudinal section of a filter device for engine oil of an internal combustion engine of a motor vehicle along a cut line I-I from FIG. 3, with a filter head and a replaceable filter that is connected to the filter head by means of a releasable bayonet-type connecting device.

The filter bellows 66 surrounds an element interior space 72 of the filter element 64. The element interior space 72 is located on a post-filtration side of the filter element 64.

The counter end plate 70 closes the element interior space 72 on the end face of the filter element 64 that faces the housing bottom 62. Supported on the outer side of the counter end plate 70 that faces the housing bottom 62 are a plurality of spring elements 74, which in turn are supported on the housing body 62 on the other side.

A spring-loaded bypass valve 76 is arranged in the counter end plate 70, the bypass valve allowing an oil flow of engine oil from the housing bottom 62 directly into the element interior space 72, bypassing the filter medium, in the opened state (under conditions not of further interest here). The bypass valve 76 is depicted in the closed position in FIG. 1.

The filter element 64 is surrounded radially outwardly by a pre-filtration-side annular space 78 that is delimited by the radially inner circumferential side of the housing pot 58.

A coaxial central tube 80 also extends in the element interior space 72, between the counter end plate 70 and the connecting end plate 68. A circumferential wall of the central tube 80 is permeable to the engine oil. A radially inner circumference side, namely, radially inner pleat edges of the filter bellows 66 can be supported on the radially outer circumference side of the central tube 80.

The connecting end plate 68 has a coaxial outlet opening 82 for the filtered engine oil. The connecting end plate 68 is molded on the radially inner circumferential side into a coaxial cylindrical connecting piece 83 that extends axially away from the element interior space 72.

An annular coaxial inner sealing unit 84 is attached to the side facing axially way from the element interior space 72. The inner sealing unit 84 is composed of an elastomer.

Figure 2:
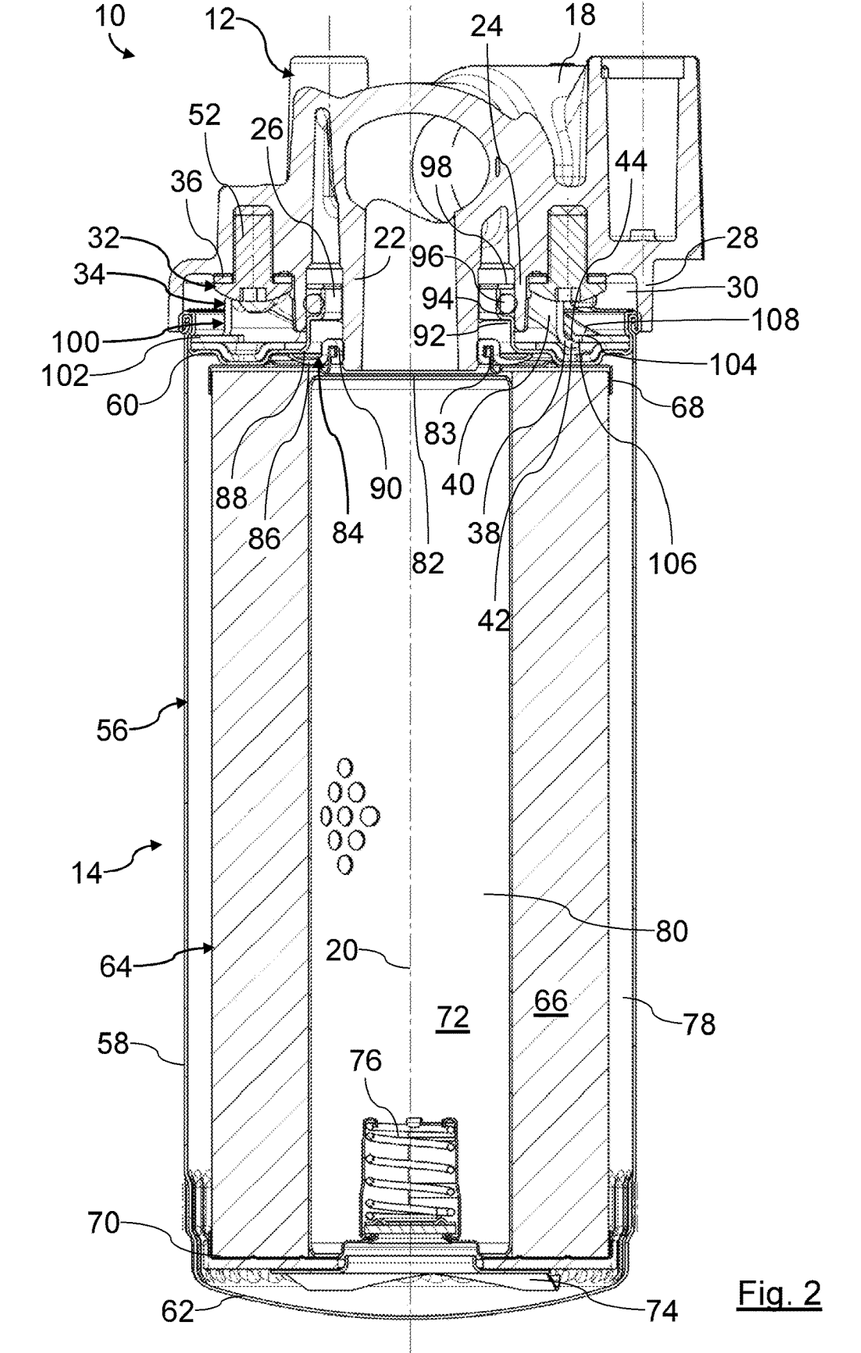
FIG. 2 illustrates a longitudinal section of the filter device from FIG. 1 along a cut line II-II from FIG. 3.
Figure 3:
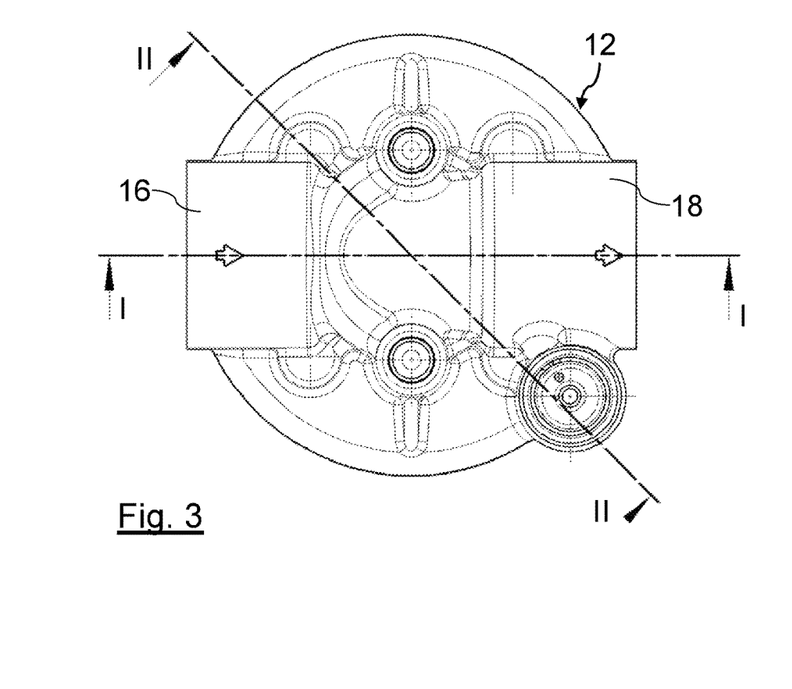
FIG. 3 is a plan view of the filter device from FIGS. 1 and 2.
Figure 4:
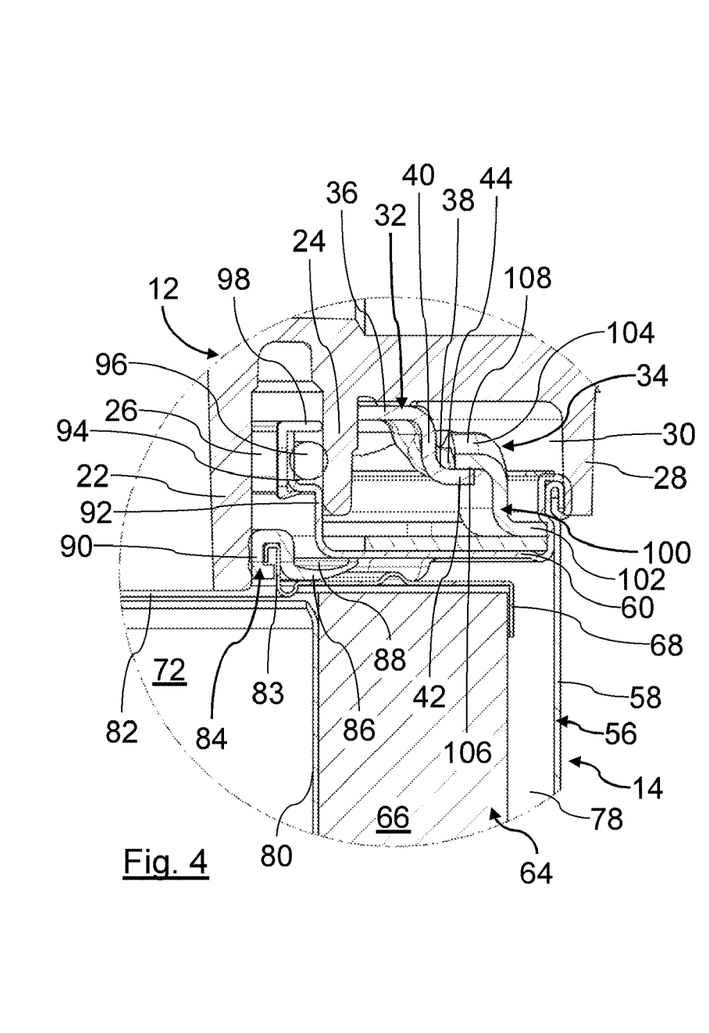
FIG. 4 is a detail view of the longitudinal section of the filter device from FIG. 1, in the region of the connecting device.

Radially outwardly, the inner sealing unit 84 has a non-return diaphragm 86. The non-return diaphragm 86 is annular in shape and surrounds the cylindrical connecting piece 83 radially outwardly. The non-return diaphragm 86 abuts against the inner side of the housing cover 60 that it faces the filter bellows 66, under a mechanical bias. The non-return diaphragm, as illustrated in FIGS. 1, 2, and 4, closes off a coaxial annular inlet opening 88 of the housing cover 60 for engine oil, in the pressure-free state. As soon as engine oil is supplied to the filter device 10, the non-return diaphragm 86 opens in the direction of passage through, due to the oil pressure. The non-return diaphragm 86 prevents the engine oil from returning through the inlet opening 88.

A radially inner ring section of the inner sealing unit 84 forms a coaxial inner sealing ring 90. The inner sealing ring 90 abuts in a sealed manner at the radially outer circumference side thereof against the radially inner circumference side of the cylindrical connecting piece 83. The inner sealing ring 90 abuts in a sealed manner at the radially inner circumference side thereof—when the replaceable filter 14 has been mounted—against a radial outer circumference side, designed to be a sealing surface, of the radially inner connecting piece 22. With the inner sealing ring 90, the post-filtration side of the replaceable filter 14 is separated from the pre-filtration side thereof in the region of the inlet opening 88.

The housing cover 60 comprises a stepped coaxial outer sealing connecting piece 92 in the region of the inlet opening 88. A narrowing of the outer sealing connecting piece 92 at the end thereof that faces axially away from the filter bellows 66 forms an outer sealing groove 94 for an outer sealing ring 96. The outer sealing ring 96 is designed as an O-ring.

A radially outer diameter of the outer sealing connecting piece 92 outside of the region of the sealing groove 94 corresponds approximately to the radially inner diameter of the outer connecting piece 24 of the filter head 12. When the replaceable filter 14 is mounted, the sealing connecting piece 92 is inserted into the outer connecting piece 24. The radially outer circumference side of the outer sealing connecting piece 92 abuts then against the radially inner circumference side of the radially outer connecting piece 24.

The outer sealing groove 94 is covered with a cover ring 98 on the side thereof that faces axially away from the filter bellows 66. The cover ring 98 is connected to the outer sealing connecting piece 92 by means of four clamping lugs.

When the replaceable filter 14 is mounted, the outer sealing ring 96 abuts against the radial inner circumference side, designed as a sealing surface, of the radially outer connecting piece 24 in a sealed manner. The outer sealing ring 96 thus separates the oil-conducting region of the filter device 10 from the connection space 30 and from the surroundings.

An annular coaxial housing connecting part 100 of the connecting device 34 is molded out of sheet metal. A thickness of the sheet metal of the housing connecting part 100 corresponds approximately to the thickness of the sheet metal of the head connecting part 31.

The housing connecting part 100 extends radially from the radially outer circumference side of the housing cover 60 to over the radial center of the connection space 30. The housing connecting part 100 overlaps with the head connecting part 32.

The housing connecting part 100 comprises a housing mounting section 102 that extends radially and circumferentially approximately in the same plane. The housing mounting section 102 is fixed radially outwardly between the housing cover 60 and the crimped connection of the housing pot 58 to the housing cover 60. The housing mounting section rests on one side flat against the housing cover 60.

The housing mounting section 102 passes on the radially inner side thereof into four identical housing-side bayonet sections 104. The housing-side bayonet sections 104 are arranged so as to be distributed circumferentially uniformly. The housing-side bayonet sections have approximately the same shape and size as the head-side bayonet sections 38.

The housing-side bayonet sections 104 have, on axially opposite sides, an inner functional surface 106 and an outer functional surface 108. The functional surfaces 106 and 108 extend opposite to the counter functional surfaces 44, each approximately helically about the connecting axis 20, with the same pitch as the counter functional surfaces 44.

The inner functional surfaces 106 are located on the side of the respective housing-side bayonet section 104 that faces the housing cover 60. The outer functional surfaces 108 are correspondingly located on the axially opposite side. In the closed state of the connecting device 34, the outer functional surfaces 108 each are engaged from behind by one of the counter functional surfaces 44 of one of the head-side bayonet sections 38, for the purpose of interaction. Then, the outer functional surfaces 108 each abut flat against the corresponding counter functional surfaces 44.

The housing-side bayonet sections 104 each comprise a housing-side latching projection 110. The latching projections 110 rise axially away from the housing cover 60. When the replaceable filter 14 is mounted, the housing-side latching projections 110 lock behind the corresponding head-side latching projections 46.

For the purpose of installation, the replaceable filter 14 is inserted forward, with the housing cover 60, coaxially onto the connection side of the filter head 12.

At the latest when the cover ring 98 arrives at the end face of the radially outer connecting piece 24 of the filter head 12 and/or the housing connecting part 100 arrives at the head connecting part 32, the replaceable filter 14 is additionally rotated about the connecting axis 20 in the right-handed direction of rotation, which is the direction of rotation for closing the connecting device 34.

As soon as the free ends of the housing-side bayonet sections 104 are positioned in the region of the corresponding head-side insert gaps 50, the respective outer functional surfaces 108 begin to be guided along the corresponding counter functional surfaces 44 on the respective guide pegs 48 and the inner functional surfaces 106. The spring arms of the leaf springs 54 are supported with the free ends thereof on the housing connecting part 100 in the axial direction. The tension achieved by the helical pitch of the counter functional surfaces 44 and the inner functional surfaces 106 in the axial direction between the bayonet sections 38 and 104 draws the inner sealing ring 90 onto the radially inner connecting piece 22 and the outer sealing ring 96 into the radially outer connecting piece 24.

As soon as the housing-side latching projections 110 abut against the corresponding head-side latching projections 46, a corresponding locking force must be overcome in order to continue turning. The locking force is realized through the restoring force of the spring arms of the leaf spring 54.

After the locking force is overcome, the housing-side latching projections 110 lock behind the housing-side latching projections 46, and thus ensure against an unintentional opening of the connecting device 34.

In order to separate the replaceable filter 14 from the filter head 12, the replaceable filter 14 is rotated to the left, i.e., the direction of opening rotation, about the connecting axis 20.

This requires first overcoming the locking force of the housing-side latching projections 110 with the head-side latching projections 46.

Under the spring biasing of the leaf spring 54, the inner functional surfaces 106 are guided along the corresponding counter functional surfaces 44. In addition, the outer functional surfaces 108 are guided along the respective guide pegs 48. Then, with the guide pegs 48, a respective axial pressing-off force onto the outer functional surfaces 108 is generated, and acts against a respective holding force of the inner sealing ring 90 and the outer sealing ring 96. The holding forces are realized through the respective friction between the inner sealing ring 90 and the inner connecting piece 22, and between the outer sealing ring 96 and the outer connecting piece 24. The pressing-off force draws the inner sealing ring 90 off in the axial direction from the inner connecting piece 22, and draws the outer sealing ring 96 out from the outer connecting piece 24.

As soon as the housing-side bayonet sections 104 leave the corresponding head-side insert gaps 50 after further rotational movement, the replaceable filter 14 is drawn away from the filter head 12 with an axial movement.

When the filter device 10 is operating, i.e., when the internal combustion engine is operating, engine oil to be purified flows through the feed 16, indicated by an arrow 112, into the annular inlet space 26. The engine oil flows out from there through the inlet opening 88, and is released by the non-return diaphragm 86 into the pre-filtration-side annular space 78 of the filter housing 56. The engine oil to be purified flows through the filter bellows 66 from radially outward to radially inward, and passes through the openings of the central tube 88 into the element interior space 72. From the element interior space 72, the purified engine oil passes through the outlet opening 82 and the radially inner connecting piece 22 of the filter head 12 to the discharge 18. The purified engine oil leaves the filter head 12 and therewith leaves the filter device 10, through the discharge 18.

Figure 7:
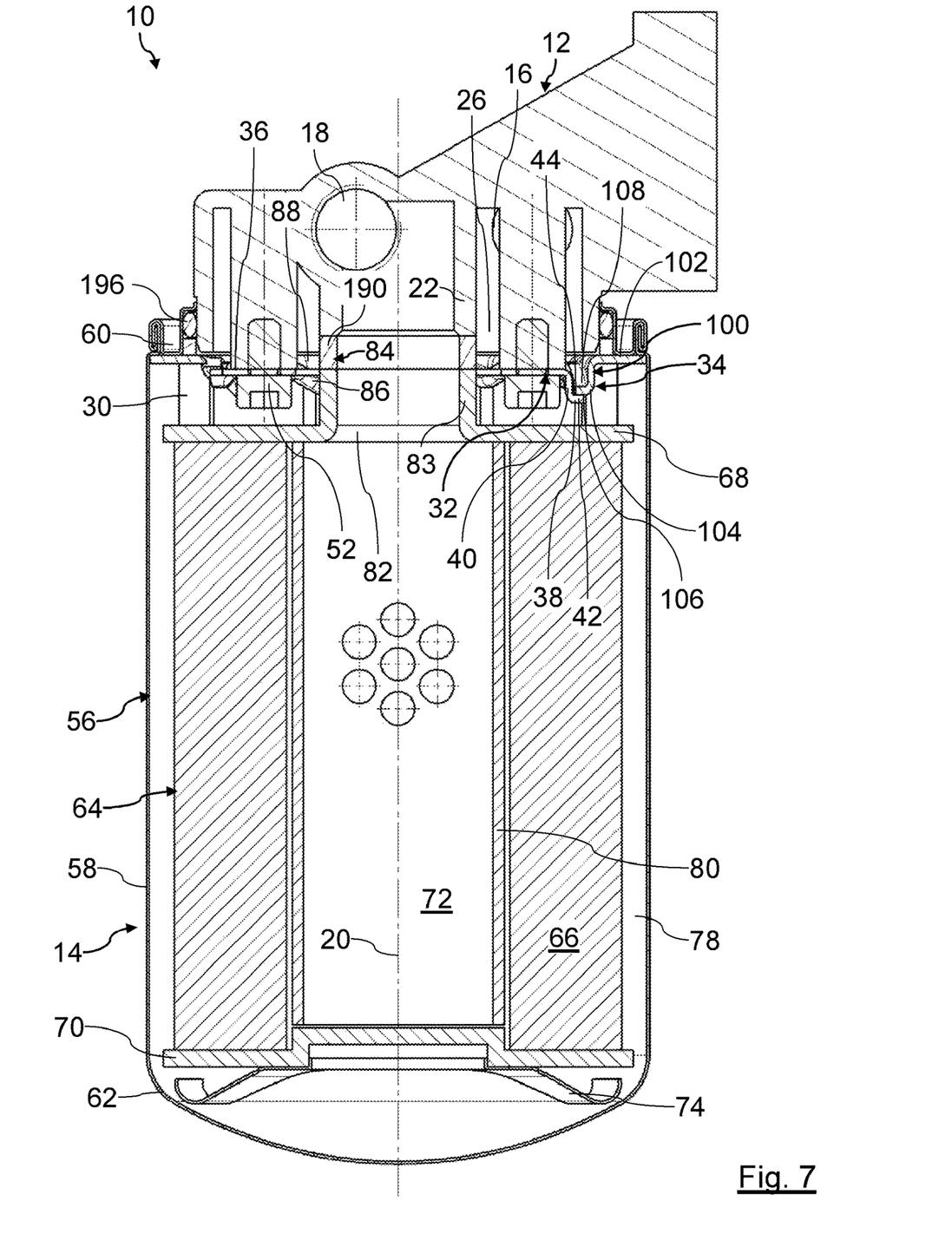
FIG. 7 illustrates a longitudinal view of a filter device according to a second embodiment, similar to the filter device from FIGS. 1 to 6.

FIG. 7 illustrates a second embodiment of a filter device 10. Those elements that are similar to those of the first embodiment from FIGS. 1 to 6 are provided with the same reference signs. The second embodiment differs from the first embodiment in that an inner seal 190 of the inner sealing unit 84 is arranged in an axially sealing manner between the radially inner connecting piece 22 of the filter head 12 and the cylindrical connecting piece 83 of the replaceable filter 14. The connecting piece 22 and the cylindrical connecting piece 83 have the same diameter. The connecting piece and the cylindrical connecting piece abut against one another in the axial direction of the interposition of the inner seal 190.

An outer sealing ring 196 is located radially outward between a radially inner circumference side of a coaxial cylindrical section of the housing cover 60 and a radially outer circumference side of the circumferential wall 28 of the filter head 12. The outer sealing ring 196 seals the connection space 30 off from the surroundings. The connection space 30 itself is fluidically connected to the annular inlet space 26.

In addition, the second embodiment forgoes a bypass valve.

What is claimed is:

1. A treatment element of a treatment device for treating and/or filtering fluids, comprising:
    a filter medium;
    a housing comprising
        a circumferential outer wall;
        a housing pot having a circumferential outer wall surrounding a connecting axis of the treatment element,
        wherein the filter medium is arranged in an interior of the housing pot;
        a housing cover attached onto a first axial end of the housing pot;
        at least one inlet for the fluid to be treated; and
        at least one outlet for the treated fluid;
    wherein the treatment element is configured and adapted to connect to a connecting head of the treatment device by a releasable bayonet-type connecting device through the execution of a rotational/plug-in movement about the connecting axis; and
    the releasable bayonet-type connecting device has
        at least one housing connecting part on the side of the housing positioned to engage with at least one head connecting part on the side of the connecting head,
        wherein said connecting parts engages with each other in order to connect the connecting device;
    wherein the at least one inlet can be connected to at least one feed of the connecting head for the fluid to be treated and/or the at least one outlet can be connected to at least one discharge of the connecting head for the treated fluid;
    wherein the treatment element comprises
        a connecting end plate arranged on an axially outer side of the filter medium and proximate to the first axial end of the housing pot;
        the at least one housing connecting part,
        wherein the at least one housing connecting part comprises:
            respective functional surfaces formed on axial opposing sides of the at least one housing connecting part, lying axially opposite to one another with respect to the connecting axis;
            wherein the material thickness of the at least one housing connecting part is constant at least in the region of the respective functional surfaces,
    wherein at least one head connecting part has at least one counter functional surface that engages against one of the functional surfaces of the at least one first connecting part from behind, for interaction purposes,
    wherein the at least one head connecting part and the at least one housing connecting part are both arranged radially within an interior of the circumferential wall of the housing and a circumferential outer wall of the connecting head,
    the treatment element further comprising:
        a radially outer sealing ring arranged radially within a radial interior of the at least one housing connecting part and at an axial outer side of the housing cover, sealing a fluid-carrying region of the treatment element to the environment; and
        a radially innermost seal ring arranged coaxial to and spaced radially inwardly from the radially outer sealing ring.

2. The treatment element of a treatment device according to claim 1, wherein
    a radially outer portion of the at least one housing connecting part forms a housing mounting section the rests again an axial outer surface of the housing cover,
    the housing mounting section arranged within a radial interior of the circumferential outer wall of the housing pot.

3. The treatment element of a treatment device according to claim 2, wherein a radial inner portion of the at least one housing connecting part forms a housing-side bayonet section which projects radially inwardly from the housing mount section, wherein the housing-side bayonet sections are spaced apart circumferentially about the connecting axis.

4. The treatment element of a treatment device according to claim 1, wherein wherein the connecting head includes a tubular cylindrical radially inner connecting piece projecting axially outwardly from the connecting head in a direction towards the treatment element;

wherein the radially innermost seal ring contacts against and circumferentially seals against a radially outer circumferential surface of the tubular cylindrical radially inner connecting piece.

5. The treatment element of a treatment device according to claim 1, wherein the at least one housing connecting part is attached to the housing by means of a crimped connection between the housing cover and the housing pot.

6. The treatment element according to claim 1, wherein the housing cover comprises sheet metal and the material thickness of the housing cover is 0.4 to 1 mm.

7. The treatment element according to claim 1, wherein the at least one head connecting part is made of sheet metal or comprises sheet metal.

8. The treatment element according to claim 1, wherein the respective functional surfaces extend approximately helically about the connecting axis.

9. The treatment element according to claim 1, wherein at least two of the respective functional surfaces are arranged axially opposite to one another with respect to the connecting axis.

10. The treatment element according to claim 1, wherein the at least one housing connecting part is made completely of sheet metal or comprises sheet metal.

* * * * *